(12) United States Patent
Chien

(10) Patent No.: US 8,230,250 B2
(45) Date of Patent: Jul. 24, 2012

(54) COMPUTER HAVING POWER SAVING STATE CONTROL FUNCTION AND CONTROL METHOD THEREOF

(75) Inventor: Wen Pin Chien, Taipei (TW)

(73) Assignee: Asustek Computer Inc., Taipei (TW)

( * ) Notice: Subject to any disclaimer, the term of this patent is extended or adjusted under 35 U.S.C. 154(b) by 442 days.

(21) Appl. No.: 12/512,603

(22) Filed: Jul. 30, 2009

(65) Prior Publication Data

US 2010/0042859 A1 Feb. 18, 2010

(30) Foreign Application Priority Data

Aug. 18, 2008 (TW) .............................. 97131479 A

(51) Int. Cl.
*G06F 1/00* (2006.01)
*G06F 1/32* (2006.01)
(52) U.S. Cl. .................... 713/323; 713/300; 713/320
(58) Field of Classification Search .................. 713/300, 713/320, 323
See application file for complete search history.

(56) References Cited

U.S. PATENT DOCUMENTS

| 5,737,616 A * | 4/1998 | Watanabe ...................... 713/340 |
| 2009/0119527 A1 * | 5/2009 | Kim .............................. 713/323 |

FOREIGN PATENT DOCUMENTS

| CN | 1619467 A1 | 5/2005 |
| CN | 101154131 A | 4/2008 |
| TW | I284283 A1 | 7/2007 |

OTHER PUBLICATIONS

English language translation of abstract of 1619467.
English language translation of abstract of I284283.
English translation of abstract of CN 101154131A.

* cited by examiner

*Primary Examiner* — Thuan Du
*Assistant Examiner* — Michael J Brown
(74) *Attorney, Agent, or Firm* — Thomas, Kayden, Horstemeyer & Risley, LLP

(57) ABSTRACT

A computer has a plurality of sleeping modes to be switch directly. The power supply assemblies provide a plurality of power supplies to elements in the computer. The storage module is used to store executing data corresponding to each sleeping mode. The power management module is used to set the number of the power supply assemblies which need to be switched on in each sleeping mode. The control module determines the sleeping mode which is switched to according to a received trigger event and sends a first switching signal to the storage module to make the storage module store the executing data and a second switching signal to the power management module to make the power management module set the number of the power supply assemblies and switches the sleeping mode of the computer directly.

15 Claims, 5 Drawing Sheets

COMPUTER HAVING POWER SAVING STATE CONTROL FUNCTION AND CONTROL METHOD THEREOF

CROSS-REFERENCES TO RELATED APPLICATIONS

This non-provisional application claims priority under 35 U.S.C. §119(a) on Patent Application No. 97131479 filed in Taiwan, R.O.C. on Aug. 18, 2008 the entire contents of which are hereby incorporated by reference.

BACKGROUND OF THE INVENTION

1. Technical Field

The invention relates to a computer and a control method and, more particularly, to a computer having a power saving state control function and a control method thereof.

2. Related Art

Electricity consuming is one of important factors in designing an electronic product. Manufacturers all wish their electronic products to reduce the power consuming. To a portable electronic device, the less power it consumes, the longer usage time its battery has. A longer usage time of the battery means that a user does not need to often change batteries, and this meets the requirement of the user.

To achieve the power saving effect, a computer system is designed to have a sleeping (power saving) mode. The computer system may enter different sleeping modes according to the user's requirement or the idle time of the computer. Different sleeping modes correspond to different power supply assemblies, respectively, and this may allow certain power supplies to be switched on or off in different sleeping modes. If the computer system works in a normal working mode all the time, all the power supplies are switched on. Thus, the computer system may save much power when it is in the sleeping mode.

When a computer system enters a sleeping mode, if it needs to be switched to another sleeping mode, according to the conventional technique, the computer system needs to be waken up to go back to the working mode first and then enters another sleeping mode.

FIG. 1 is a schematic diagram showing the switching of the conventional sleeping mode. Supposing that the computer system is in the first sleeping mode (S1), if it wants to enter a deeper second sleeping mode (S2) from the first sleeping mode (S1), all the power supplies should be switched on, and the computer should go back to the working mode (S0). Thus, the computer system may enter the second sleeping mode (S2). That is, the computer cannot be switched between different sleeping modes (S1 to S4) directly. No matter which sleeping mode the computer is in, if the sleeping mode needs to be switched, the computer has to go back to the working mode (S0) and then enter another sleeping mode. Thus, the switching time between different sleeping modes is prolonged, and since all the power supplies should be switched on to make the computer go back to the working mode and then perform the following processes (enter another sleeping mode), unnecessary power is consumed.

SUMMARY

The invention provides a computer having power saving state control function and a control method thereof to solve the problem of the prior art.

The invention provides a computer having a power saving state control function and a plurality of sleeping modes to be switched directly. The computer includes power supply assemblies, a storage module, a power management module and a control module. The power supply assemblies provide a plurality of power supplies to a plurality of elements in the computer. The storage module is used to store executing data corresponding to each sleeping mode. The power management module is used to set the number of the power supply assemblies which need to be switched correspondingly on in each sleeping mode. The control module determines the sleeping mode which is switched to according to an received trigger event and sends a first switching signal to the storage module to make the storage module store the executing data and a second switching signal to the power management module to make the power management module set the number of the power supply assemblies and switch the computer from a first sleeping mode to a second sleeping mode directly.

The invention also provides a power saving state control method adapted to a computer having a plurality of power supply assemblies and a plurality of sleeping modes to be switched directly. The control method includes the steps as follows. A trigger event is received. An event property of the trigger event is determined. When the event property is a sleeping event, and the computer is in the first sleeping mode, the executing data corresponding to the first sleeping mode is stored first, and then the number of the power supply assemblies which need to be switched off is set. Then, the computer is switched to the second sleeping mode from the first sleeping mode. When the event property is a waking event, and the computer is in the second sleeping mode, the number of the power supply assemblies which need to be switched on is set, and then the executing data corresponding to the first sleeping mode is restored. Then, the computer is switched to the first sleeping mode from the second sleeping mode directly.

In the device and method of the invention, when the computer system enters a sleeping mode, the sleeping mode may be switched to other sleeping modes according to the received event without going back to the working mode. Thus, the power management mode is more flexible, the lifespan of a battery is prolonged, and the usage is more intuitively.

DETAILED DESCRIPTION

Figure 2:
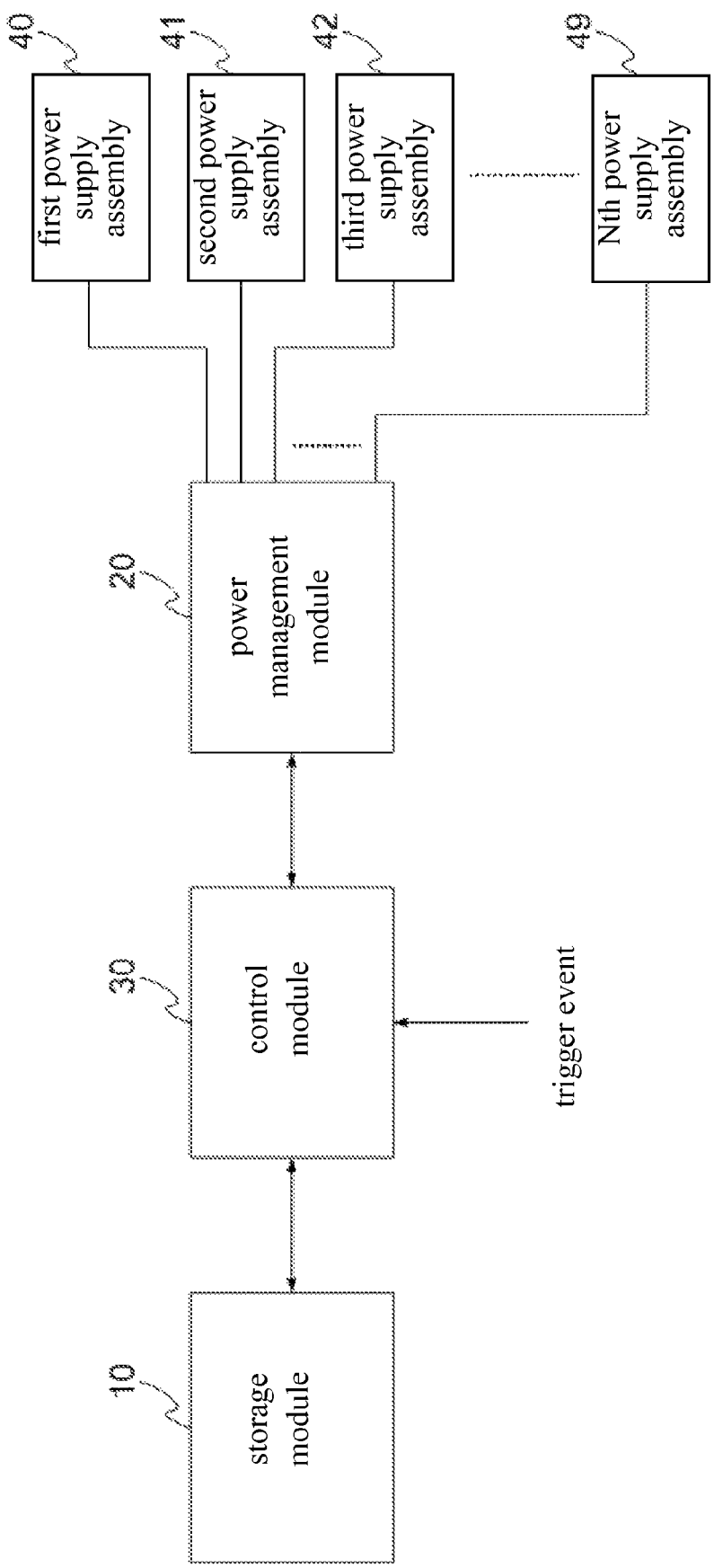
FIG. 2 is a schematic diagram showing the computer having the power saving state control function in the first embodiment of the invention.

FIG. 2 is a schematic diagram showing the computer having the power saving state control function in the first embodiment of the invention. As shown in FIG. 2, the computer in the invention has a plurality of sleeping modes to be switched, and the computer includes a storage module 10, a power management module 20, a control module 30 and power supply assemblies 40 to 49.

The computer has different power saving states, and it may enter different sleeping modes. The number of power supply assemblies needed by the computer in different sleeping modes is different. The power supply assemblies 40 to 49 provide power to a plurality of elements in the computer. The executing data processed by the computer is also different according to different sleeping modes. For example, when the computer enters a deeper sleeping mode from a shallower sleeping mode, the computer needs less power supply assemblies in the deeper sleeping mode than in the shallower sleeping mode (the power saving effect is good). Thus, the remaining power supplies are not enough to process the executing data in the shallower sleeping mode originally, and the executing data in the shallower sleeping mode originally should be stored. The storage module 10 may be used to store the executing data corresponding to each sleeping mode.

As stated above, the number of power supply assemblies needed by the computer in different sleeping modes is different. For example, in the working mode (S0), all the power supply assemblies, namely the first power supply assembly 40, the second power supply assembly 41, the third power supply assembly 42 to the Nth power supply assembly 49 are switched on, and in the first sleeping mode (S1), one power supply assembly may be switched off. In the second sleeping mode (S2), another power supply assembly also may be switched off. Others are by parity of reasoning. Thus, the power management module 20 is used to set the number of the power supply assemblies which need to be switched on in each sleeping mode.

The control module 30 receives the trigger event and determines which sleeping mode should be switched to according to the trigger event. Then, the control module sends a first switching signal to the storage module 10 to make the storage module 10 stores the executing data and a second switching signal to the power management module 20 to make the power management module 20 set the number of the corresponding power supply assemblies. Thus, the computer may be switched between sleeping modes and it may enter another sleeping mode directly, which is illustrated in detail in the following part. The control module may be selected from the group consisting of a south bridge chip, a north bridge chip, an embedded controller, a keyboard controlled and their combinations. They are the elements originally in the computer system, and new elements are not needed. Thus, the extra cost is not needed.

Figure 3:
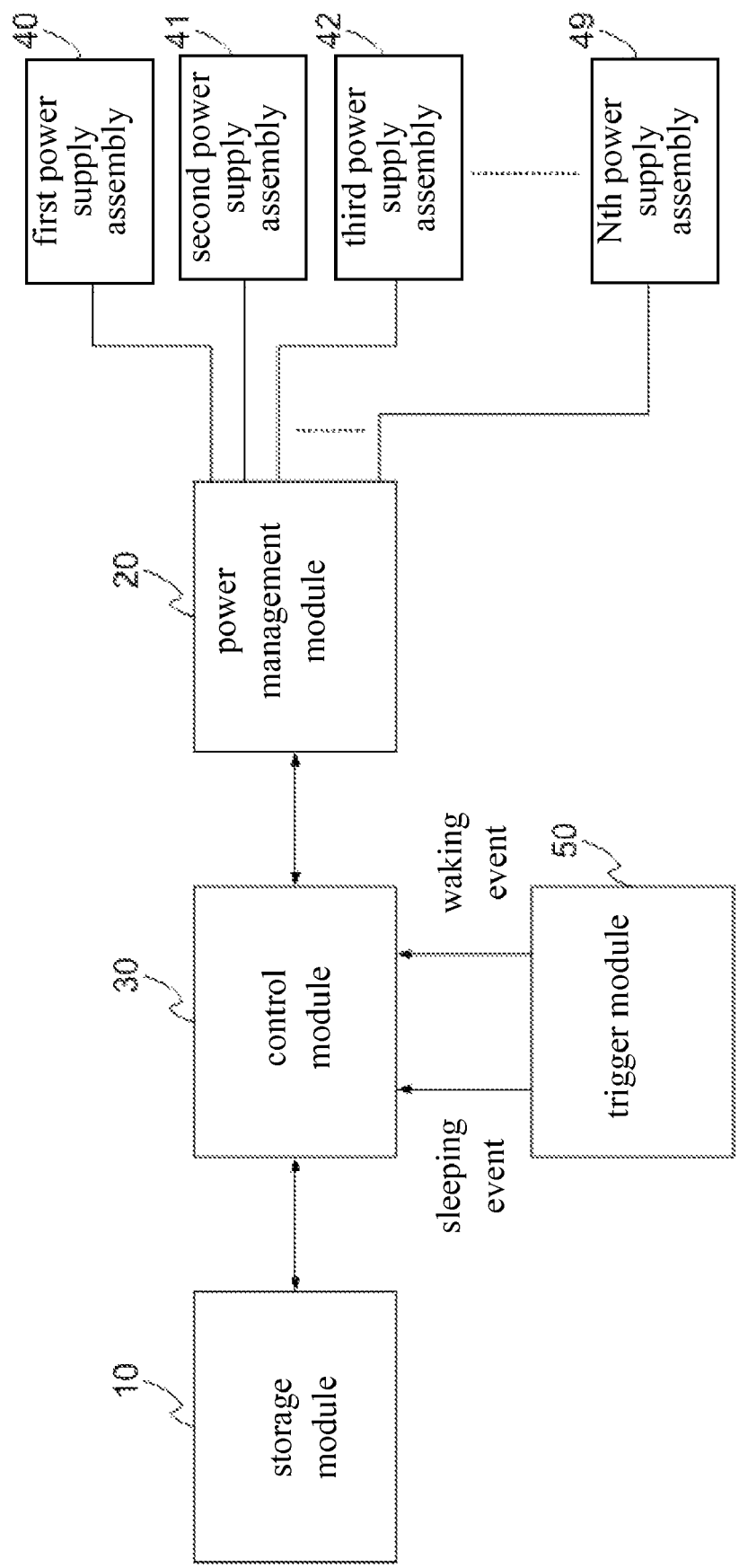
FIG. 3 is a schematic diagram showing the computer having the power saving state control function in the second embodiment of the invention.

FIG. 3 is a schematic diagram showing the computer having the power saving state control function in the second embodiment of the invention. The second embodiment further includes a trigger module 50. The trigger module 50 may generate two different trigger events, and they are a sleeping event and a waking event, respectively. The two events are illustrated herein, respectively.

When the trigger event generated by the trigger module 50 is a sleeping event, it means that the computer enters a deeper sleeping mode from the current mode (that may be a working mode or a sleeping mode). For example, supposing that the computer is in the first sleeping mode (S1) originally, the first power supply assembly 40, the second power supply assembly 41 and the third power supply assembly 42 to the N–1th power supply assembly are switched on. When the control module 30 receives the sleeping event generated by the trigger module 50, the sleeping event triggers the computer to enter the third sleeping mode (S3). At that moment, the control module 30 stores the executing data in the storage module 10, and then the power management module 20 switches off the corresponding power supply assemblies to leave the power supply assemblies necessary for the third sleeping mode (S3). Thus, only the first power supply assembly 40, the second power supply assembly 41 and the third power supply assembly 42 to the N–3th power supply assembly are switched on. This may save the power of the computer. When the deeper sleeping mode needs to be entered, the computer does not need to go back to the working mode to enter another sleeping mode as in the prior art. In the invention, the computer may be switched to another sleeping mode from a sleeping mode directly.

The storage module 10 in the invention may be a cache memory, a register, a random access memory (RAM), a hard disk and other kinds of storage modules. For example, since the sleeping modes are different, the executing data of the different sleeping modes may be stored in different kinds of storage modules 10. Supposing that the executing data of the first sleeping mode (the shallower sleeping mode) is stored in the RAM, and the executing data of the third sleeping mode (the deeper sleeping mode) is stored in the hard disk, when the trigger event is the sleeping event, the control module 30 retrieves the executing data from the RAM and stores the executing data in the hard disk.

In another aspect, when the trigger event generated by the trigger module 50 is a waking event, it means that the computer wants to enter a shallower sleeping mode from a sleeping mode. For example, supposing that the computer is in the third sleeping mode (S3), the first power supply assembly 40, the second power supply assembly 41, the third power supply assembly 42 to the N–3th power supply assembly is switched on. When the control module 30 receives the waking event generated by the trigger module 50, the waking event triggers the computer to enter the first sleeping mode (S1). At that moment, the control module 30 controls the power management module 20 to switch on the corresponding power supply assemblies. Thus, the necessary power supply assemblies for the first sleeping mode (S1) are switched on. That is, the N–2th power supply assembly and the N–1th power supply assembly are switched on, and thus the first power supply assembly 40, the second power supply assembly 41, the third power supply assembly 42 to the N–1th power supply assembly are switched on. Afterwards, the executing data is stored in the storage module 10. The executing data may be stored in the RAM instead of in the hard disk. When the computer wants to enter the shallower sleeping mode, it also may enter another sleeping mode from a sleeping mode without going back to the working mode to perform the subsequence processes.

Figure 1:
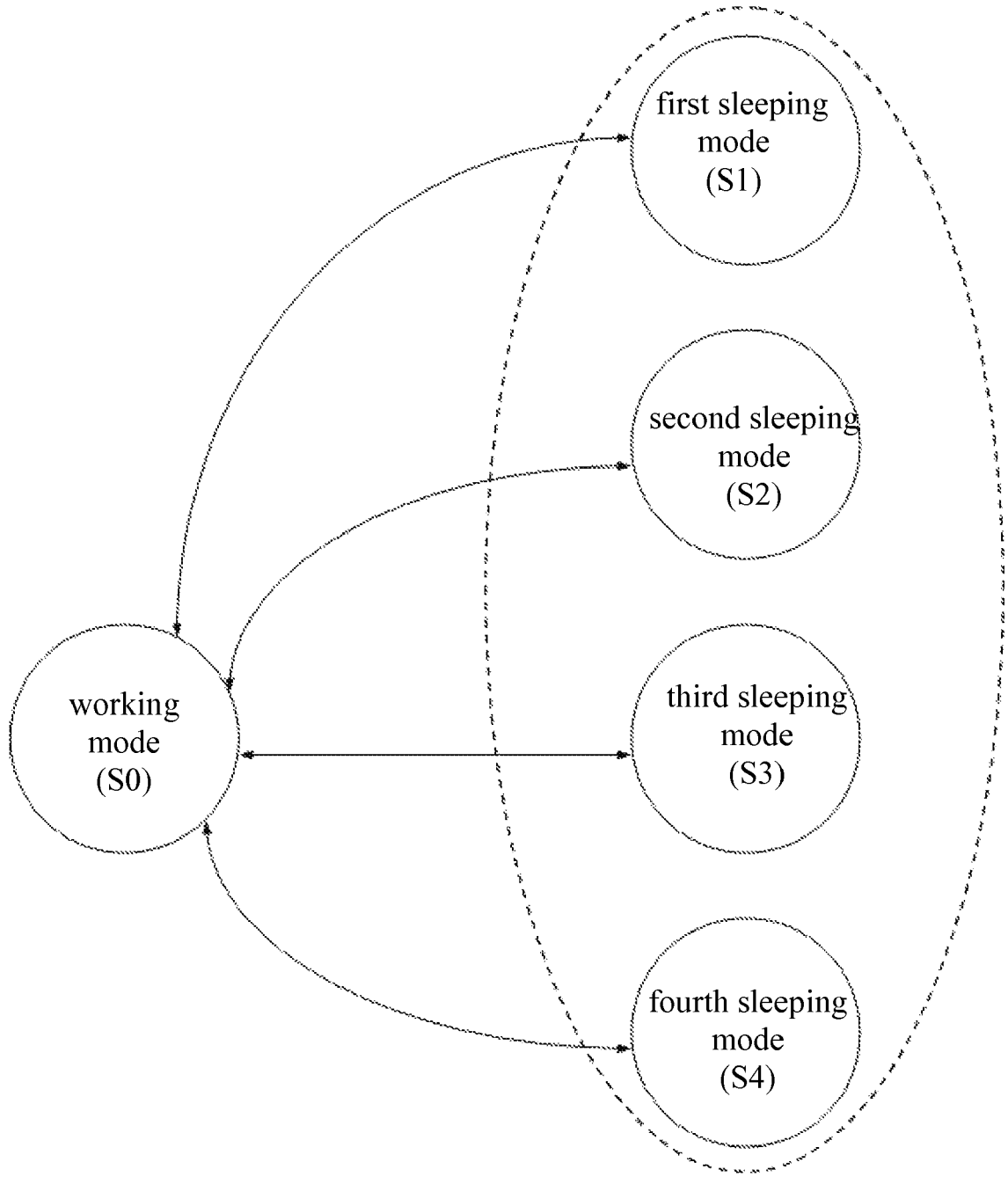
FIG. 1 is a schematic diagram showing the switching of the conventional sleeping mode.
Figure 4:
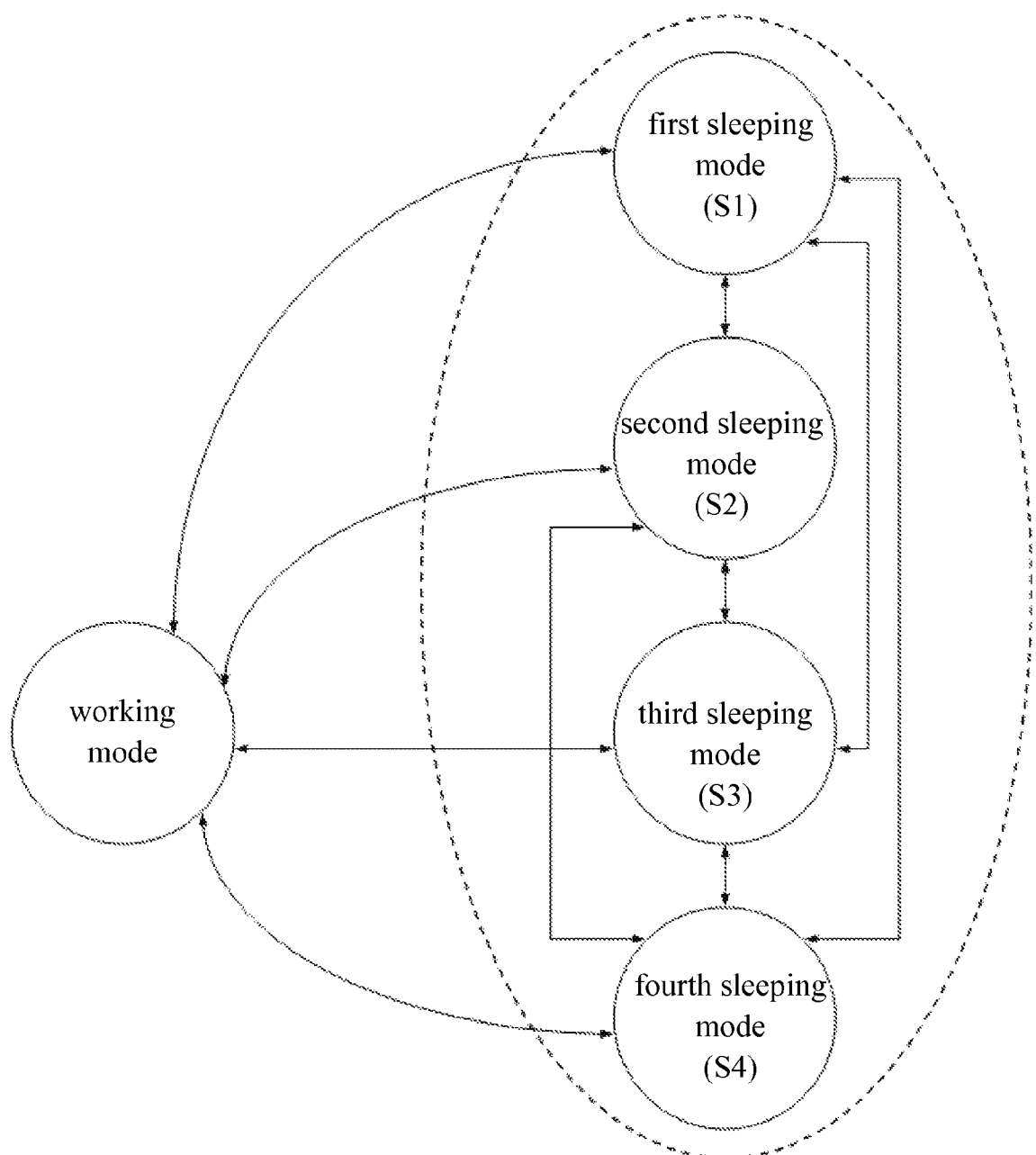
FIG. 4 is a schematic diagram showing the switching of the sleeping mode in the embodiment of the invention.

FIG. 4 is a schematic diagram showing the switching of the sleeping mode in an embodiment of the invention. The device in the invention may allow the computer to be switched between different sleeping modes. Comparing FIG. 1 with FIG. 4, in the device of the invention, the computer may be switched between each sleeping mode and the working mode. In addition, the computer may be switched between different sleeping modes directly. Compared with the conventional technique, the step of going back to the working mode to enter another sleeping mode is not needed. This may improve the switching efficiency between different sleeping modes, and it also provides more flexible power management mode to improve the lifespan of the battery.

To make the computer system enter different sleeping modes or the working mode conveniently, the trigger module 50 may include a key. The user may trigger different events (such as the sleeping event or the waking event) by the key on the computer. A wired or wireless network device also may generate a trigger event, or an open or closed state of a display, electricity quantity of a battery or whether an adapter is inserted also may generate the trigger event.

In addition, the trigger event also may be achieved by software inside the computer system. The trigger module 50 may include a timer. The user may set the timer in the computer system first. Supposing that a special time (such as 30 minutes) is set, if the user does not use the computer, a deeper sleeping mode is entered. Thus, after the special time, the sleeping event is triggered via the setting of the timer. Similarly, if the computer is switched from the working mode to a deepest sleeping mode, the timer in the computer system may be set in the working mode. Supposing that a special time such as an hour and a half is set, and the computer needs to go back to the shallowest sleeping mode from the deepest sleeping mode, if the computer system has four sleeping modes, the computer may generate a waking event automatically every 30 minutes to make the computer enter a shallower sleeping mode. Thus, the requirement of the user may be achieved by the timer. That is, after an hour and a half, the computer enters the first sleeping mode (the shallowest sleeping mode) from the fourth sleeping mode (the deepest sleeping mode) automatically.

Figure 5:
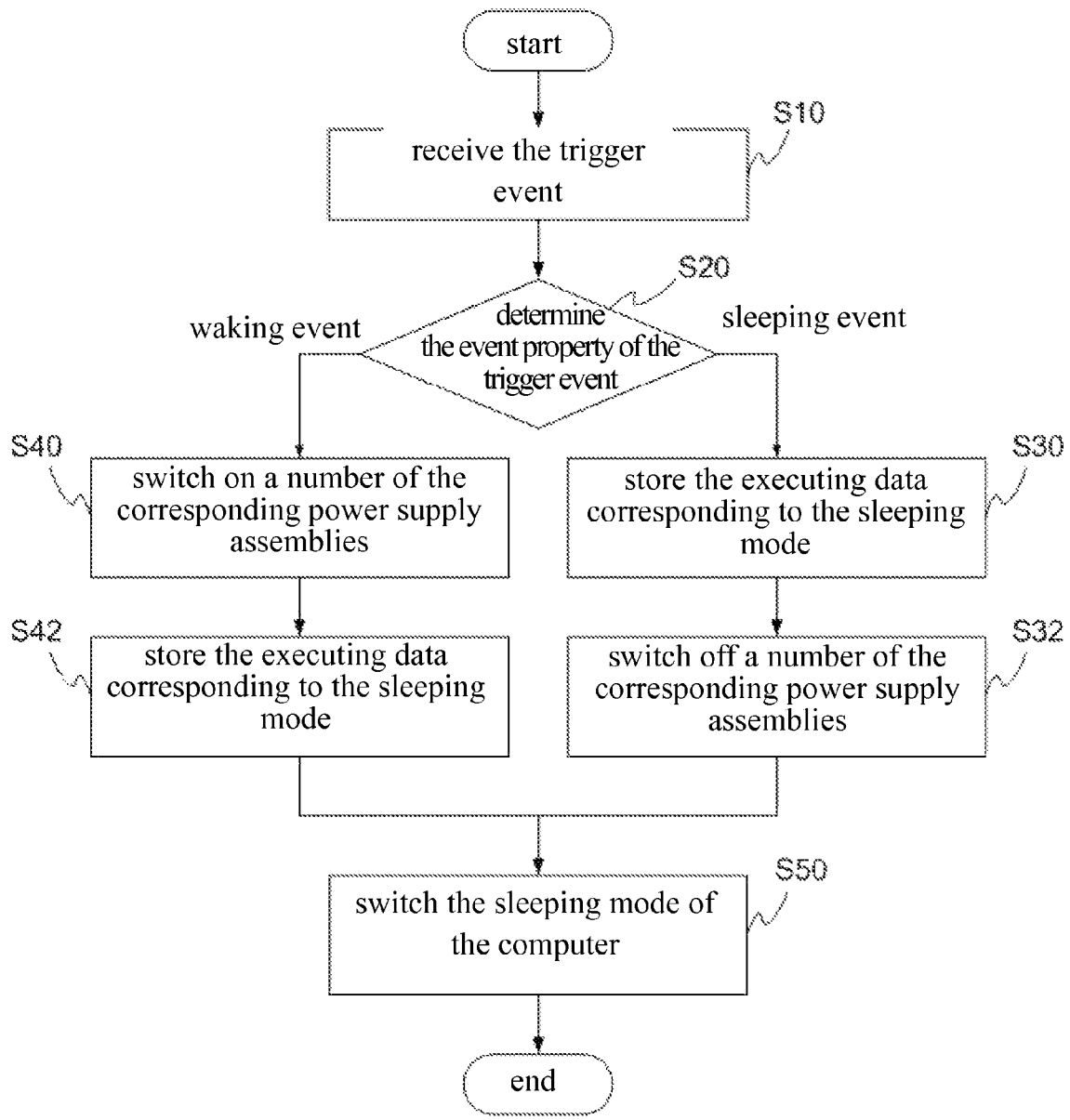
FIG. 5 is a flow chart showing the power saving state control method.

FIG. 5 is a flow chart showing the power saving state control method. The control method may be used in the computer having a plurality of power supply assemblies and a plurality of sleeping modes to be switched. The control method includes the steps as follows.

In step S10, the trigger event is received. The trigger event may be generated by the key or the timer.

In step S20, the event property of the trigger event is determined.

In step S30, if the event property is a sleeping event, the executing data corresponding to the sleeping mode is stored according to the determining result in step S20.

In step S32, a number of the power supply assemblies are switched off correspondingly.

In step S40, if the event property is a waking event, a number power supply assemblies are switched on correspondingly according to the determining result in step S20.

In step S42, the executing data corresponding to the sleeping mode is stored.

In step S50, the sleeping mode of the computer is switched.

While the present invention has been described by the way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A computer having a power saving state control function and a plurality of sleeping modes to be switched directly, the computer comprising:
    a plurality of power supply assemblies providing a plurality of power supplies to a plurality of elements in the computer;
    a storage module for storing executing data corresponding to each of the sleeping modes;
    a power management module for setting the number of power supply assemblies which need to be switched on for each of the sleeping modes; and
    a control module determining one of the sleeping modes which the computer is switched to according to a received trigger event, when the control module determines the computer to switch from a first sleeping mode of the sleeping modes to a second sleeping mode of the sleeping modes, the control module makes the storage module to store the executing data corresponding to the first sleeping mode and makes the power management module to set the number of the power supply assemblies corresponding to the second sleeping mode to be on and then switching the computer from the first sleeping mode to the second sleeping mode directly.

2. The computer according to claim 1, wherein the trigger event is a sleeping event.

3. The computer according to claim 2, wherein the control module stores the executing data in the storage module and controls the power management module to switch off a number of the corresponding power supply assemblies.

4. The computer according to claim 1, wherein the trigger event is a waking event.

5. The computer according to claim 4, wherein the control module controls the power management module to switch on a number of the corresponding power supply assemblies and then stores the executing data in the storage module.

6. The computer according to claim 1, further comprising: a trigger module for generating the trigger event.

7. The computer according to claim 6, wherein the trigger module comprises a key.

8. The computer according to claim 6, wherein the trigger module comprises a timer.

9. The computer according to claim 1, wherein the storage module is selected from the group consisting of a cache memory, a register, a random access memory (RAM), a hard disk and their combinations.

10. The computer according to claim 1, wherein the control module is selected from the group consisting of a south bridge chip, a north bridge chip, an embedded controller, a keyboard controller and their combinations.

11. A power saving state control method adapted to a computer having a plurality of power supply assemblies and a plurality of sleeping modes to be switched directly, the control method comprising the steps of:
    receiving a trigger event;
    determining an event property of the trigger event; and
    when the event property is a sleeping event, storing executing data corresponding to a first sleeping mode of the sleeping modes and setting the number of the power supply assemblies corresponding to a second sleeping mode of the sleeping modes to be on, such that the computer is switched from the first sleeping mode to the second sleeping mode; and
    when the event property is a waking event, setting the number of the power supply assemblies corresponding to the second sleeping mode to be on and restoring the executing data corresponding to the first sleeping mode, such that the computer is directly switched from the second sleeping mode to the first sleeping mode.

12. The power saving state control method according to claim 11, wherein the step of receiving the trigger event comprises the step of:
    generating the trigger event by a key.

13. The power saving state control method according to claim 11, wherein the step of receiving the trigger event comprises the step of:
    generating the trigger event by a timer.

14. The power saving state control method according to claim 11, wherein the step of receiving the trigger event comprises the step of:
    generating the trigger event by a wired or wireless network device.

15. The power saving state control method according to claim 11, wherein the step of receiving the trigger event comprises the step of:
    generating the trigger event via an open or closed state of display, electricity quantity of a battery or whether an adapter is inserted.

* * * * *